June 6, 1933.  J. U. LEHN  1,912,457
ANIMAL TRAP
Filed May 14, 1932   3 Sheets-Sheet 2
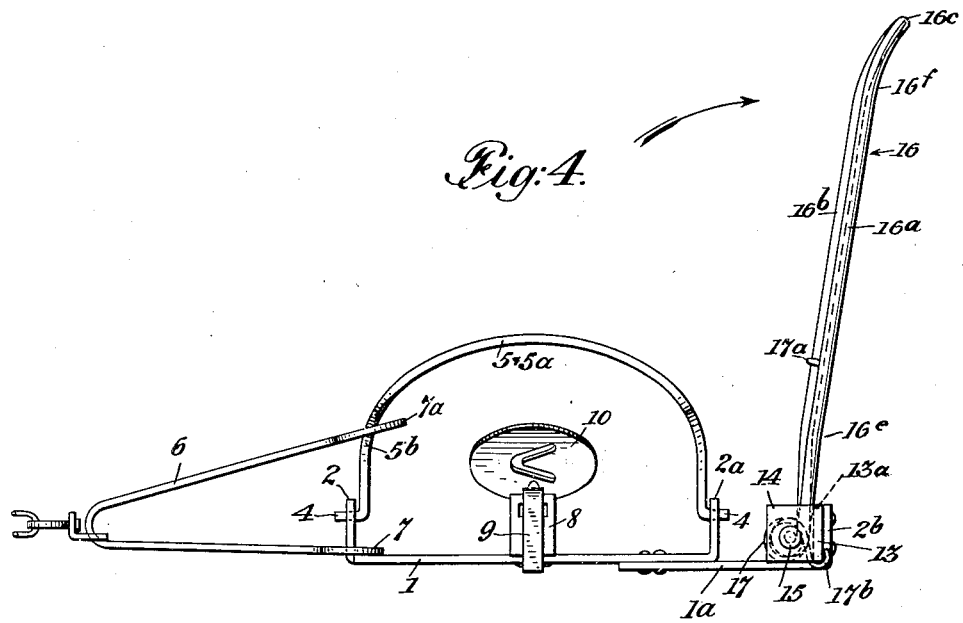
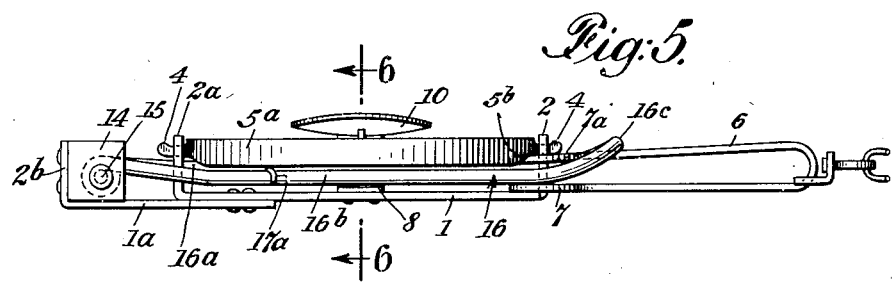
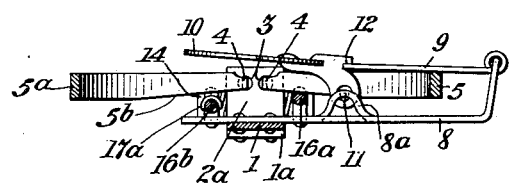
John U. Lehn INVENTOR
BY Louis Prevost Whitaker ATTORNEY June 6, 1933.    J. U. LEHN    1,912,457
ANIMAL TRAP
Filed May 14, 1932    3 Sheets-Sheet 3

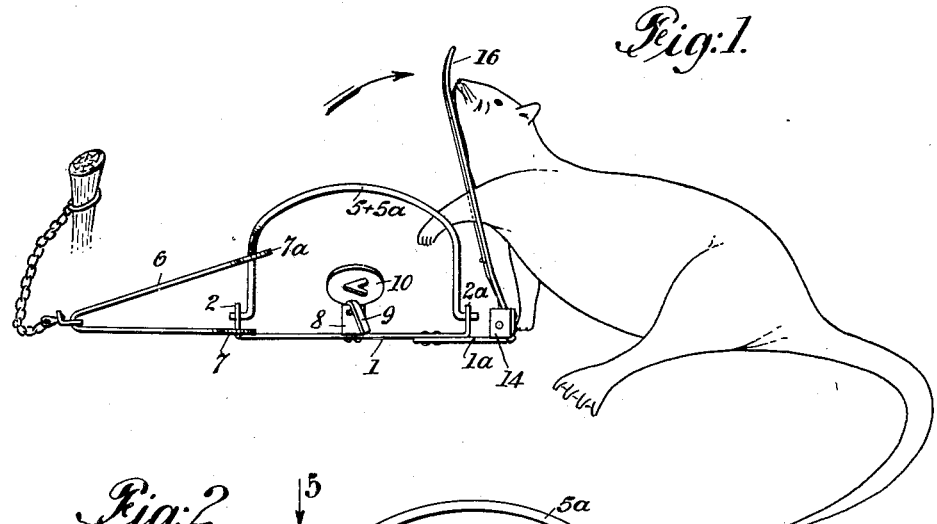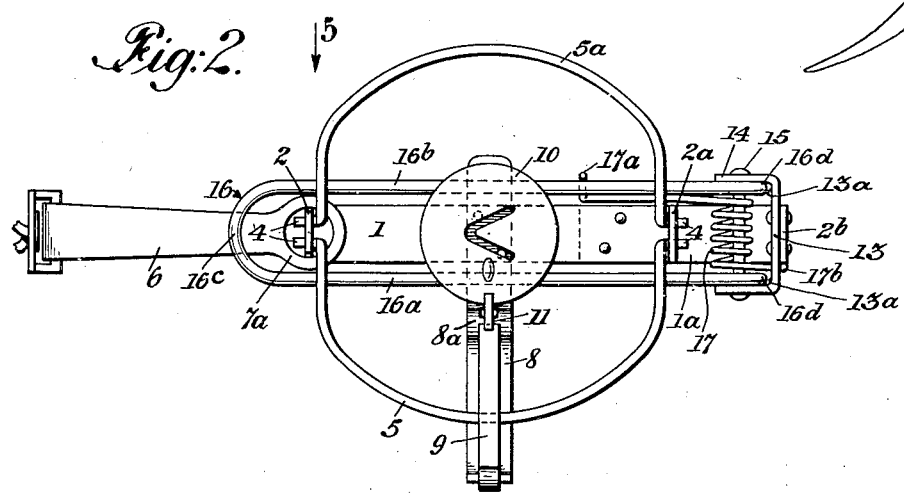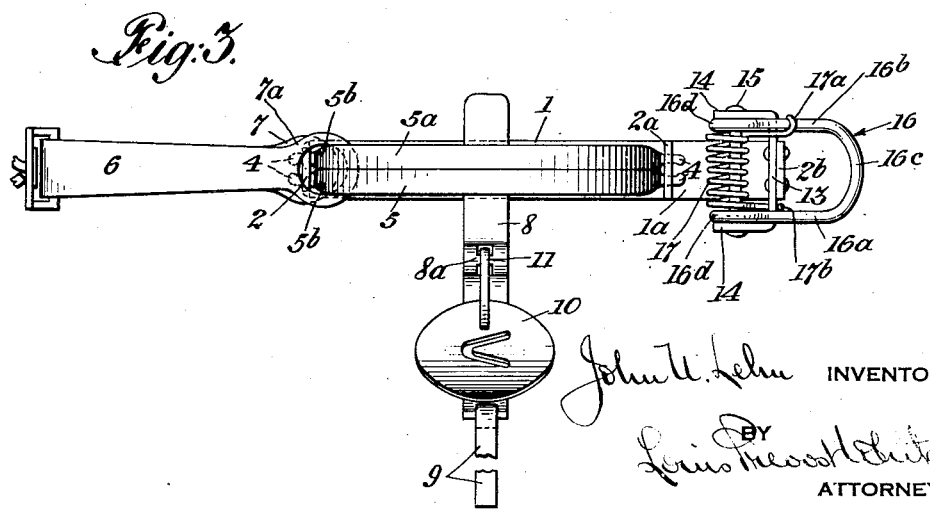

INVENTOR
John U. Lehn
BY
ATTORNEY

Patented June 6, 1933

1,912,457

UNITED STATES PATENT OFFICE

JOHN U. LEHN, OF LITITZ, PENNSYLVANIA, ASSIGNOR TO ANIMAL TRAP COMPANY OF AMERICA, OF LITITZ, PENNSYLVANIA, A CORPORATION OF PENNSYLVANIA

ANIMAL TRAP

Application filed May 14, 1932. Serial No. 611,257.

This invention consists in the novel features hereinafter described, reference being had to the accompanying drawings which illustrate several embodiments of the inventions, selected for purposes of illustration, and the said invention is fully disclosed in the following description and claims.

In the use of the ordinary trap provided with a pair of gripping jaws, in the commercial trapping of muskrats and other small fur bearing animals, it frequently happens that after the trap is sprung and grips a leg of the animal, the animal twists about until the imprisoned leg is broken at a point adjacent to the engagement of the jaws therewith, and is "wrung off" a term used by trappers to describe this twisting action, or in some cases is gnawed off by the animal, so that it escapes and thus diminishes the catch.

It has been proposed to obviate the escape of the animal by providing an auxiliary jaw or jaws for clamping or gripping the animal at another part of the body, between such auxiliary jaws, or between an auxiliary jaw and a part of the trap acting as a stationary jaw. These auxiliary jaws, are, like the main jaws, operated by heavy springs, and strike the animal with great force, usually killing it instantly, and in any event preventing the escape of the animal in the event that it is not retained by the main clamping jaws. Such traps are more difficult to set without injury to the trapper, than the ordinary trap, and the very forcible engagement of the auxiliary jaw or jaws with the animal frequently results in bruises, or other injury to the pelt, which results in the hair brushing out after the pelt is tanned, and thus impairs the value of the pelt.

This invention proceeds along an entirely different line, and consists in providing a trap having a single gripping means, as a single pair of jaws or gripping members for gripping a leg of the animal, with a pivoted leg embracing guard comprising a pair of substantially parallel rods held at all times in fixed relation to each other and separated from each other a distance but slightly greater than the distance between the outer edges of the two jaws when closed, upon the leg of an animal, and not sufficient to permit the passage of the body of the animal therebetween at any point. Said rods are connected at their outer ends, and said guard is provided with a very light independent spring of sufficient strength merely to overcome the weight of the animal to be trapped, as a muskrat, for example, and is normally held thereby against a stop in a substantially vertical position, in the unset position of the trap. This leg embracing guard is brought into substantially horizontal position when the trap is set and may be conveniently held by one of the jaws of the trap. When the trap is sprung and the jaws grip a leg of the animal, in the usual manner, this leg embracing guard is moved by its light spring in a direction away from the trap jaws, loosely engaging the leg of the animal which is gripped by the jaws, and sliding freely along said leg until arrested by its stop or by engagement with a portion of the body of the animal, without killing, injuring or bruising the animal, or impairing the pelt in any way. After the trap is sprung, the leg embracing guard acts merely to restrain the lateral movement of the leg, at a distance from the trap jaws, thus preventing the animal from bending the portion of the leg adjacent to the jaws transversely thereof so as to break the leg and allow it to "wring off", and also preventing the animal from reaching that portion of the leg to gnaw it off. It will be clearly understood that the leg embracing guard is not a jaw and is incapable of performing any function of a jaw. Obviously if the animal succeeded in eluding, or withdrawing from, the jaws of the trap, it could easily withdraw its leg from the guard and escape, but in practice the employment of this guard will prevent the animal from extricating itself from the trap jaws and render the catch of traps provided therewith, practically certain.

In the preferred embodiment of my invention the substantially parallel rods of the leg embracing guard are substantially straight and substantially parallel throughout their entire length, in which case the guard will ordinarily be swung down into horizontal position while the usual treadle, or "pan" is in raised position, and the treadle will extend above the guard in the set position of the trap. In some embodiments of the invention, however, the substantially parallel rods of the guard may be provided at points between their inner and outer ends with outwardly deflected portions to enable them to clear the treadle or pan and its pivotal support in swinging it down into horizontal position in setting the trap, it being understood that the space between the outwardly deflected portions of the guard must not be sufficiently great to permit the body of the animal to pass through. In one embodiment of the invention, hereinafter described, I employ a special form of treadle or pan in connection with the corresponding outwardly deflected portions of the guard, in order to reduce as much as possible the space between the outwardly deflected portions of the guard and prevent the escape of smaller animals therefrom.

This invention also comprises certain novel features of construction and combination of parts hereinafter fully described and particularly pointed out in the claims.

Referring to the said drawings,

Fig. 1 shows a side elevation of the trap in closed position, illustrating the position of an animal held by the trap jaws with its leg engaged by the leg embracing guard at a distance from the jaws.

Fig. 2 is an enlarged plan view showing the trap in set position.

Fig. 3 is a similar view showing the parts in normal released position.

Fig. 4 is a side elevation of the trap in the position indicated in Fig. 3.

Fig. 5 is a side elevation of the trap in set position, taken in the direction of the arrow, 5, in Fig. 2.

Fig. 6 is a transverse sectional view on line 6—6 of Fig. 5.

Figure 7:
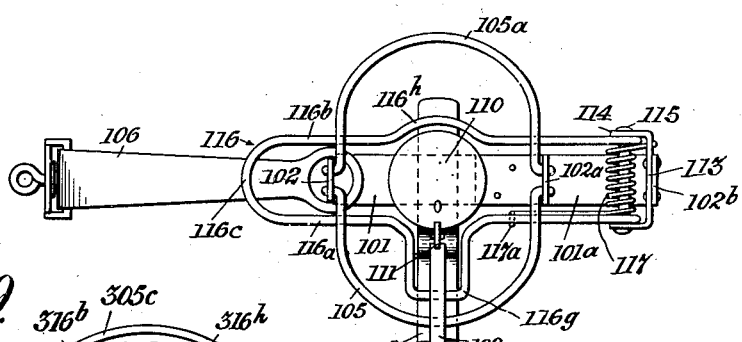
Fig. 7 is a view similar to Fig. 2, of a trap of slightly smaller size, having the side members of the guard provided with outwardly deflected portions to clear the treadle and its pivotal connection.

In the embodiment of the invention illustrated in Figs. 1 to 6 of the drawings, the trap comprises a longitudinal main frame, 1, having upwardly extending lugs, 2, 2a, each provided with two pivotal apertures, 3, 3, to receive the trunnions, 4, 4, of a pair of trap jaws, 5, 5a, of any usual or preferred construction, which constitute the only clamping means by which the animal is held. The jaws, 5, 5a, are closed by a trap spring, 6, which in this instance is a bent flat spring provided at one end with a loop, 7, which surrounds the lug, 2, and rests on the frame, 1, while the other end of the spring is provided with a loop, 7a, which embraces the adjacent portions of both jaws, and engages inclined or curved cam portions, 5b, 5b, thereof to effect the closing of the jaws, in a well known way.

The frame, 1, is provided with a transversely disposed cross bar, 8, which carries at its outer end a pivotal latch, 9, which is adapted to be swung inwardly over one of the trap jaws, in this instance, jaw, 5, when the trap is set. Between the inner and outer ends of the cross bar, 8, a latch releasing treadle or "pan", 10, is pivoted at 11, to an upwardly bent portion, 8a, of the cross bar, and this treadle is provided with a locking detent, 12, to overlie the free end of the latch, 9, and hold the trap in set position, as clearly shown in Fig. 6.

At one end of the trap jaws, 5, 5a, and preferably at the end opposite the trap spring, 6, the main frame is provided with a longitudinal extension, 1a, which carries at its outer end a lug, 2b. The extension, 1a, may be formed in one piece with the frame, or it may be formed separately and secured thereto by welding, or by bolts or rivets, or in any other way. As shown, it is formed separately and riveted to the frame, 1. The lug, 2b, is shown provided with a bracket, 13, rigidly connected with the lug, 2b, and having parallel arms, 14, extending in a direction toward the jaws, 5, 5a, which arms support a pivot pin or shaft, 15, on which is mounted a leg embracing guard, indicated as a whole at 16, and comprising a pair of substantially parallel rods, 16a, 16b, connected at their outer ends by a portion, 16c, preferably integral and preferably curved as shown, and the opposite end of each of said rods is provided with means, as an eye, 16d, to pivotally engage the pivot pin or shaft, 15. The rods, 16a, 16b, are rigidly held in spaced relation at all times a distance apart but slightly greater than the distance between the outer edges of the trap jaws when closed upon the leg of an animal and less than the thickness of the body of the animal, and the guard can be swung downwardly by hand over the trap jaws, when the latter are in closed position. Each of the rods, 16a, 16b, is bent outwardly adjacent to its pivotal connection, as indicated at 16e, and adjacent to its outer end, as indicated at 16f, so that the main portions of the rods, between these bends, which I term the offset portions, will lie in a substantially horizontal position when the trap is set, below the plane of the jaws, as shown in Fig. 5, and permit one of said rods (16a) to engage the jaw, 5, which is held by the latch, 9, in the set position of the trap. The bends in the rod, 16b, at the points, 16e and 16f, are slightly greater than those in the rod, 16a, to offset the intermediate portion of the rod, 16b, to a greater extent than the corresponding portion of the rod, 16a, as clearly shown in Figs. 5 and 6, so that the rod, 16b, sets below and preferably out of contact with the free jaw, 5a, in the set position of the trap, and insures that the said free jaw shall lie in the desired horizontal position and cannot possibly be affected by the guard, in the set position.

The leg embracing guard, 16, is provided with a comparatively light guard actuating spring, 17, entirely independent of the trap spring, and arranged to throw the guard in a direction away from the frame, 1, and jaws, 5, 5a (as indicated by the arrows in Figs. 1 and 4) from a substantially horizontal position to a substantially vertical position, in which the guard is positively arrested at a distance from the jaws, by a stop. In this instance the stop is formed by a portion of the bracket, indicated at 13a, against which portions of the rods, 16a, 16b, adjacent to their pivotal support, will abut, as clearly shown in Fig. 4. The spring, 17, is shown as a light coil spring, surrounding the pivot pin, 15, one end, 17a, engaging one of the rods, 16a, 16b, and the other end, 17b, engaging the bracket, 13. The guard actuating spring is not only much weaker than the trap spring, 6, but in practice has only sufficient force to overcome the weight of the muskrat or other animal to be trapped, and is not strong enough to either kill, wound or bruise the animal, or impair its pelt, by any contact therewith.

In order to set the trap, the lightly yielding guard is swung downward by hand over the trap jaws, the treadle, 10, is swung inward above the guard, 16, and the trap spring, 6, is then compressed, to release the jaws and permit them to open over the guard, and the guard is further depressed until the jaws are in the set position (see Figs. 2, 5 and 6). The latch, 9, is then brought over the jaw, 5, and secured by the treadle, 10, in the usual manner. The guard will thus be held in substantially horizontal position by the engagement of the jaw, 5, with the rod, 16a, while the rod, 16b, will be held below the horizontal plane of the rod, 16a, so as to permit the loose jaw, 5a, to lie horizontal and in its lowest position.

When the trap is sprung, by the foot of the animal depressing the treadle, the trap jaws, 5, 5a, will be brought together in the usual way to clamp a portion of the leg of the animal between them. The leg embracing guard will be released by the closing of the trap jaws, 5, 5a, and will be swung by its light spring, 17, in the direction of the arrow, Figs. 1 and 4, away from the frame, 1, and jaws, 5, 5a, causing it to slide up the leg of the animal which is held between the jaws, until it is arrested at a distance from said jaws, by its stop, or by contact with the thicker portion of the leg, or with the body of the animal, which it tends to push away from the trap jaws. If the guard comes into contact with the body of the animal, it will touch only the under portions of the body, as will be readily seen, and merely embrace and hold the leg of the animal at a distance from the trap jaws against any lateral movement with respect to the trap jaws, 5, 5a, which would otherwise tend to break the bone and permit the animal to "wring off" and escape, and preventing the animal from reaching the portion of its leg adjacent to the trap jaws to gnaw it off.

It will be clearly apparent that the leg embracing guard is not a jaw and forms no part of the clamping means by which the animal is held. Its use in connection with a single pair of gripping jaws, or other gripping means, however, increases the certainty of securing the animal caught by said gripping means without danger of injury to the animal or to the pelt, and without material addition to the cost of the trap. Moreover, this improved trap can be set as easily as any other trap having a single pair of jaws, and without danger of injuring the hands of the trapper.

In Fig. 7, in which corresponding parts are indicated by the same reference numerals with the addition of 100, to avoid repetition, the substantially parallel members 116a, 116b, of the guard are provided at a point between the ends of the guard with oppositely disposed outwardly deflected portions, 116g, 116h, for the purpose of enabling the guard to clear the treadle or "pan", 110, and its pivotal support. Thus, the outwardly deflected portion, 116g, is given a rectangular shape, at its outer end, to pass around the locking detent, 112, of the treadle, while the opposite outwardly deflected portion, 116h, is preferably given merely an outward curve to conform with the contiguous edge of the treadle, these treadles being usually of substantially circular form. The operation of this embodiment of the invention is exactly the same as that previously described, except that in setting the trap it is not necessary to see that the treadle is out of the way of the guard before swinging the guard to its horizontal position. In the setting of the trap shown in Fig. 7, no attention need be paid to the treadle except to set it in locking engagement with the latch, 109. It will be understood that the space between the outwardly deflected portions of the guard members must not be great enough to permit the passage of the body of the animal for which the trap is intended to pass therethrough.

Figure 8:
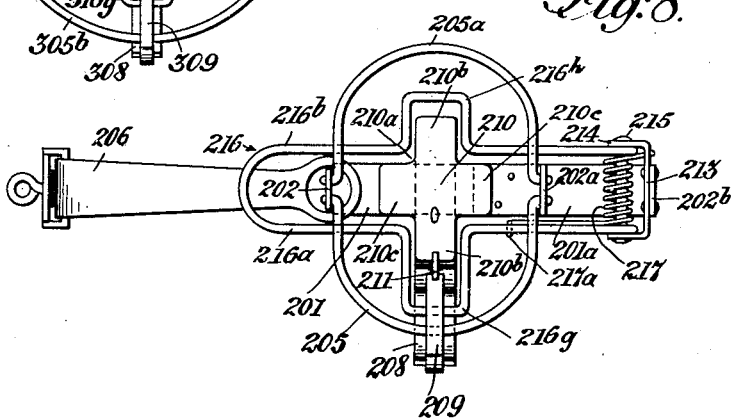
Fig. 8 is a view similar to Fig. 7, showing the trap provided with a specially formed treadle, and the guard members provided with outwardly deflected portions to clear it and its pivotal support, to minimize the space between the said outwardly deflected portions.

In Fig. 8, another slight modification of the invention is shown, in which the parts corresponding with those shown in Figs. 1 to 6 are given the same reference numerals with the addition of 200, to avoid repetition. In this embodiment, a special form of treadle, indicated at 210, and which is in the form of a cross having the re-entrant angles, indicated at 210a, forming the oppositely disposed projecting portions extending transversely of the trap, as at 210b, 210b, and longitudinally of the trap, as at 210c, 210c, is shown. The lateral members 216a, 216b, are in this instance provided with outwardly deflected portions, 216g, 216h, both of which are substantially rectangular in form, to conform with the adjacent transversely disposed projecting portions, 210b, 210b, of the treadle. This construction enables the guard to clear the treadle and its pivotal support, and detent, in the manner previously described, and at the same time provides a smaller space between the oppositely disposed outwardly deflected portions, thus preventing the possibility of the passage of the animal's body therethrough.

Figure 9:
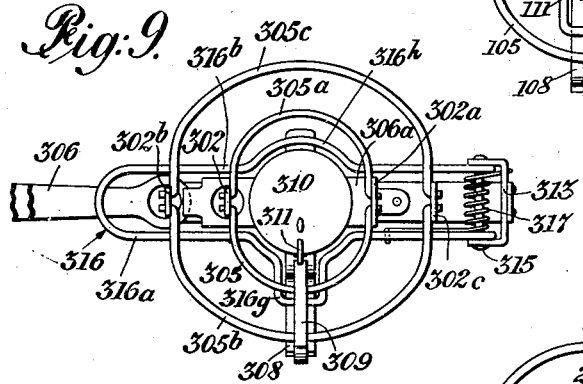
Fig. 9 is a view similar to Fig. 7, showing the invention embodied in a four jaw trap, the main jaw actuating spring being partly broken away.

It is within the scope of the invention to embody it in a trap provided with more than a single pair of jaws, and in Fig. 9, in which the parts corresponding to those shown in Figs. 1 to 6 inclusive, are given the same reference characters, with the addition of 300, the invention is illustrated in a trap having four jaws, each of the jaws of one pair having its trunnions substantially in coaxial alignment with a jaw of the other pair. In this figure, 305 and 305a, represent the smaller pair of jaws pivotally mounted in lugs, 302 and 302a, while 305b and 305c, represent the larger jaws having their trunnions mounted in lugs, 302b and 302c. 306 represents the actuating spring for the larger pair of jaws, and 306a, represents the actuating spring for the smaller pair of jaws. 310 represents the "pan" or treadle, provided with the detent, 311, for engaging the free end of the pivoted latch, 309, which in this instance extends across one of the larger jaws (305b) and one of the smaller jaws (305) to hold them in the set position. The guard 316, is pivotally mounted on the shaft, 315, carried by the bracket, 313, and operatively connected with the spring, 317, in the manner hereinbefore described, and in the set position of the trap it lies below both pairs of jaws, the lateral members, 316a and 316b, being provided with the offset portions, 316g and 316h, respectively, to clear the "pan" or treadle, and said lateral members being separated a distance slightly greater than the distance between the outer edges of said jaws when gripping the leg of an animal, but insufficient to permit the passage of the body of the animal between them, as previously described. When the trap is sprung, both sets of jaws will be brought together, one or both pair gripping the leg of the animal between them, and the release of the jaws permits the guard to swing upwardly into a vertical position to loosely embrace the leg of the animal gripped in the gripping means at a distance from the outermost or larger pair of jaws, in the manner previously described.

What I claim and desire to secure by Letters Patent is.

1. In an animal trap, the combination with gripping means, of a movable leg embracing guard of loop shape held in substantially horizontal position when the trap is set, and said guard being provided with lateral members held rigidly in spaced relation to each other at all times, said guard being movable from said substantially horizontal position in a direction away from said gripping means and into a position to loosely confine the leg of said animal engaged by said gripping means at a distance therefrom, the space between said lateral members of said guard being only sufficient to embrace the leg of the animal, but insufficient to permit the body of the animal for which the trap is intended to pass therebetween.

2. In an animal trap, the combination with gripping means, of a pivotally supported leg embracing guard of loop shape, capable of being swung down into and held in a substantially horizontal position in the set position of the trap, said guard being provided with lateral members held rigidly in spaced relation to each other at all times, and means for swinging said guard from said substantially horizontal position in a direction away from said gripping means, to bring said guard into position to loosely embrace the leg of said animal engaged by said gripping means, at a distance therefrom, the space between the lateral members of said guard being only sufficient to embrace the leg of the animal, but insufficient to permit the passage of the body of the animal therebetween.

3. In an animal trap, the combination with gripping means, of a spring actuated leg embracing guard of loop shape movable under the actuation of its spring in a direction away from said gripping means, and provided with lateral members held rigidly in spaced relation to each other at all times for loosely embracing the member of the animal engaged by said gripping means, at a distance therefrom, the space between the lateral members of said guard being only sufficient to embrace the leg of the animal, but insufficient to permit the passage of the body of the animal for which the trap is intended to pass therethrough.

4. In an animal trap, the combination with gripping means, of a pivotally supported leg embracing guard comprising members held rigidly at all times in spaced relation to each other, a distance apart only sufficient to loosely embrace and slide up the leg of an animal engaged by said gripping means, but not sufficient to permit the passage of the body of the animal between them, and a light spring sufficiently strong to overcome the weight of the animal connected with said guard for swinging it in a direction away from said gripping means to loosely confine the leg of the animal engaged by said gripping means at a distance therefrom.

5. In an animal trap, the combination with a spring actuated gripping means, and locking and lock releasing means therefor, of a spring actuated leg embracing guard movable under the actuation of its spring in a direction away from said gripping means and provided with members held rigidly in spaced relation to each other at all times a distance apart only sufficient to loosely embrace the leg of the animal held in said gripping means, but not sufficient to permit the body of the animal to pass between said members, for loosely confining the leg of the animal engaged by said gripping means, at a distance therefrom.

6. In an animal trap, the combination with a single pair of spring actuated gripping jaws, and locking and lock releasing means therefor, of an independent spring actuated pivotally mounted leg embracing guard, movable under the actuation of its spring in a direction away from said jaws, and comprising substantially parallel members held at all times in fixed relation with each other a distance apart only sufficient to embrace the leg of the animal, but insufficient to permit the passage of the body of the animal therethrough, for loosely confining the leg of the animal held in said jaws, at a distance therefrom.

7. In an animal trap, the combination with a single pair of spring actuated gripping jaws, and locking and lock releasing means therefor, of a leg embracing guard comprising substantially parallel members held rigidly in spaced relation a distance apart only slightly greater than the distance between the outer edges of said jaws when gripped upon the leg of an animal and insufficient to permit the passage of the body of the animal between said members, and pivotally supported adjacent to one end thereof, and adapted to be held in horizontal position by engagement with one of said jaws when in set position, and a light guard actuating spring acting on said guard to swing it in a direction away from said jaws, when the trap is sprung, to cause said guard to loosely confine the leg of the animal held between said jaws, at a distance therefrom.

8. In an animal trap, the combination with a single pair of spring actuated gripping jaws, and locking and lock releasing means therefor, of a leg embracing guard comprising substantially parallel members held rigidly in spaced relation a distance apart only slightly greater than the distance between the outer edges of said jaws when gripped upon the leg of an animal and insufficient to permit the passage of the body of the animal between said members, and connected at their outer end, said guard being pivotally supported adjacent to one end of said jaws, and exterior thereto, and adapted to be held in horizontal position by one of said jaws when in set position, a light guard actuating spring acting on said guard to swing it in a direction away from said jaws, when the trap is sprung to cause said guard to loosely confine the leg of the animal held between said jaws, and a stop for engaging a portion of said guard at a point adjacent to its pivotal support to arrest said guard, in a substantially vertical position and at a distance from said jaws.

9. In an animal trap, the combination with a longitudinal frame, gripping jaws pivotally mounted thereon, an actuating trap spring for said jaws, a laterally supported pivoted latch for engaging one of said jaws, a releasing treadle for holding said latch when the trap is set, and a transversely disposed supporting pivot carried by said frame, exterior to one end of said jaws, of a leg embracing guard comprising a pair of substantially parallel members held rigidly in spaced relation a distance apart only slightly greater than the distance between the outer edges of said jaws, when gripped upon the leg of an animal and insufficient to permit the passage of the body of the animal between said members, and having their outer ends connected, and their inner ends pivotally mounted on said pivotal support, said guard being adapted to be held in horizontal position by the engagement of the latch engaging jaw with one member of the guard, the other member of the guard having offset portions between its ends adjacent to the other jaw, a guard actuating light spring acting on said guard, to swing it in a direction away from said jaws when the trap is sprung and cause it to loosely confine the leg of the animal held by said jaws, and a stop for engaging a portion of said guard adjacent to its pivotal support to arrest said guard in a substantially vertical position, and at a distance from said jaws.

10. In an animal trap, the combination with gripping means, locking means therefor and a releasing treadle for said locking means, of a pivotally mounted leg embracing guard comprising a pair of members held rigidly in spaced relation at all times a distance apart only sufficient to loosely embrace the leg of the animal held in said gripping means but insufficient at any point to permit the passage of the body of the animal between said members, said spaced members of said guard having oppositely disposed outwardly deflected portions, to enable said guard to clear said treadle when moving to and from a horizontal position, said guard being held in substantially horizontal position by said gripping means in the set position of the trap, and an independent light spring engaging said guard for swinging it in a direction away from said gripping means to loosely confine a member of the animal gripped by said gripping means at a distance therefrom.

11. In an animal trap, the combination with a single pair of spring actuated gripping jaws, a locking latch for engaging one of said jaws, and a pivotally mounted releasing treadle, of a pivotally supported leg embracing guard comprising a pair of members held rigidly in spaced relation at all times, and having substantially parallel portions adjacent to each end of the guard separated a distance only slightly greater than the distance between the outer edges of said jaws when gripped upon the leg of an animal and insufficient to permit the passage of the body of the animal between said members, and having oppositely disposed outwardly deflected portions at points between the ends of said guard to clear said treadle, said guard being capable of being manually swung into horizontal position below the plane of said jaws when in set position, and an independent light spring engaging said guard for swinging it in a direction away from said jaws, to loosely hold the leg of the animal which is gripped between said jaws, at a distance therefrom, and a stop for engaging a portion of said guard adjacent to its pivotal support to arrest said guard in a substantially vertical position, and at a distance from said jaws.

12. In an animal trap, the combination with gripping means, locking means therefor, and a pivoted releasing treadle for said locking means, provided with narrow oppositely disposed portions in a line transversely of the trap, of a pivotally mounted leg embracing guard comprising a pair of substantially parallel members held rigidly in spaced relation at all times a distance apart only sufficient to loosely embrace a leg of the animal held in said gripping means but insufficient at any point to permit the body of the animal to pass between said members, said members of said guard having oppositely disposed outwardly deflected portions conforming with the transversely arranged oppositely disposed projecting portions of the treadle, to enable said guard to clear the treadle when moving to and from a horizontal position, said guard being held in substantially horizontal position by said gripping means in the set position of the trap, and an independent light spring engaging said guard for swinging it in a direction away from said gripping means to loosely engage the leg of the animal gripped by said gripping means, at a distance therefrom.

13. In an animal trap, the combination with a frame and pivoted gripping jaws thereon, of a U-shaped leg embracing guard pivoted to the frame and adapted to straddle and pass over the jaws when closed, said guard having its legs spaced apart only sufficiently to pass the jaws when closed on the leg of an animal, but insufficient to pass the body of an animal and means acting when the jaws are released to move the guard over the jaws and push the body of the animal away from the jaws, said guard being adapted to prevent lateral movement of the animal's leg with respect to the jaws.

14. In an animal trap, the combination with a frame and spring actuated gripping jaws pivoted thereon, of a U-shaped leg embracing guard pivoted to the frame and lying substantially parallel with the frame in the set position of the trap and adapted to straddle and pass over the jaws when the trap is sprung, the legs of said guard being spaced apart only sufficiently to pass said jaws when closed on the leg of an animal, but insufficient to pass the body of the animal and means acting when the trap is sprung to move the guard from its position parallel with the frame to a position substantially at right angles to the frame, to loosely confine the leg of the animal, hold the body of the animal away from the jaws, and prevent lateral movement of the animal's leg with respect to the jaws.

In testimony whereof I affix my signature.

JOHN U. LEHN.